United States Patent [19]
Vigano

[11] Patent Number: 6,026,556
[45] Date of Patent: Feb. 22, 2000

[54] METHOD FOR MAKING ALUMINIUM BOILER UNITS FOR COFFEE MAKING MACHINES, IN PARTICULAR BOILER UNITS HAVING A FACETED UPWARDLY TAPERING SIDE SURFACE

[75] Inventor: Eugenio Vigano, Nibionno, Italy

[73] Assignee: Vev Inox Industria Casalinghi S.r.l, Nibionno (Lecco), Italy

[21] Appl. No.: 08/779,244

[22] Filed: Jan. 3, 1997

[30] Foreign Application Priority Data

Feb. 1, 1996 [IT] Italy .................................. MI96A0176

[51] Int. Cl.[7] ..................................... B23P 11/00
[52] U.S. Cl. ................................. 29/509; 29/416
[58] Field of Search ............................. 29/509, 557, 558, 29/412, 416, 890.051; 72/338

[56] References Cited

U.S. PATENT DOCUMENTS

| | | | |
|---|---|---|---|
| 2,089,972 | 8/1937 | Lyon | 72/338 X |
| 3,552,341 | 1/1971 | Lannin | 29/416 X |
| 3,973,316 | 8/1976 | Maher | 29/416 |
| 5,483,813 | 1/1996 | Clark et al. | 72/338 X |

*Primary Examiner*—S. Thomas Hughes
*Attorney, Agent, or Firm*—Bucknam and Archer

[57] ABSTRACT

A method for making aluminum boiler units for coffee making machines of the type having a faceted upwardly tapering side surface, comprises a step of drawing an aluminum disc, to provide a hollow body, having substantially the configuration of the boiler unit to be made, a closed top end and an open bottom end. About the top end portion of the hollow body is formed, by a rolling operation, a thread for screw engaging with the top portion of the coffee making machine. Then, by a cutting operation, the metal disc closing the top end portion of the boiler unit body is removed, whereas the bottom end portion thereof is closed by an aluminum bottom element which is clamped to the boiler unit body.

3 Claims, 3 Drawing Sheets

METHOD FOR MAKING ALUMINIUM BOILER UNITS FOR COFFEE MAKING MACHINES, IN PARTICULAR BOILER UNITS HAVING A FACETED UPWARDLY TAPERING SIDE SURFACE

BACKGROUND OF THE INVENTION

The present invention relates to a method for making aluminium boiler units for coffee making machines, in particular boiler units having a faceted upwardly tapering side surface.

Among the available aluminium coffee makers, one which has encountered a large success is the commercially available so-called "moka" maker, i.e. a coffee maker comprising a boiler unit having the configuration of a frustum of a pyramid provided with a polygonal bottom, the small base of the pyramid being upwardly facing, the coffee maker also comprising a like, but reversed, top portion.

The mentioned coffee maker is conventionally made by casting or die-casting an aluminium material.

Conventionally, this aluminium material comprises an aluminium alloy having a comparatively high silicon content, for providing, in the casting operation, the necessary flow capability to the metal material in order to faithfully reproduce in the coffee maker being made the details of the hollow of the forming mold.

In particular, the silicon material is necessary to provide a satisfactory casting or die-casting operation.

On the other hand, such a silicon content is undesirable since an aluminium alloy with a comparatively high silicon content is subjected to easy oxidation.

SUMMARY OF THE INVENTION

Accordingly, the aim of the present invention is to overcome the above mentioned drawback, by providing a method for making aluminium boiler units for coffee making machines, in particular for the so-called "moka" coffee makers, which provides highly oxidation resistant boiler unit.

Within the scope of the above mentioned aim, a main object of the present invention is to provide such a coffee maker making method which provides boiler units, in particular of the so-called "moka" type, which can be made by molding operations, so as to allow an aluminium material to be used which is very resistant to oxidation.

Another object of the present invention is to provide such a method for which allows moka boiler units to be made which are very competitive from a mere economic standpoint.

Yet another object of the present invention is to provide such a moka coffee maker making method which provides coffee makers having a very good aesthetic aspect as well as a long duration, much greater than that of conventional coffee makers made by means of casting or die-casting methods and which, moreover, are very reliable and safe in operation.

According to one aspect of the present invention, the above mentioned aim and objects, as well yet other objects, which will become more apparent hereinafter, are achieved by a method for making aluminium boiler units for coffee making machines, in particular boiler units having a faceted upwardly tapering side surface, characterized in that said method comprises the steps of drawing an aluminium disc so as to provide a hollow body having substantially a configuration of a boiler unit to be made, but including a closed top end portion and an open bottom end portion, forming, by rolling, a thread about said top end portion, removing, by cutting, a metal disc closing the top end portion of said hollow body and applying, by clamping, an aluminium bottom element to said body for closing said bottom end portion thereof.

BRIEF DESCRIPTION OF THE DRAWINGS

Further characteristics and advantages of the method according to the present invention will become more apparent hereinafter from the following detailed disclosure of a preferred, though not exclusive, embodiment thereof, which is illustrated, by way of an indicative, but not limitative, example, in the figures of the accompanying drawings, where.

DESCRIPTION OF THE PREFERRED EMBODIMENT

Figure 1:
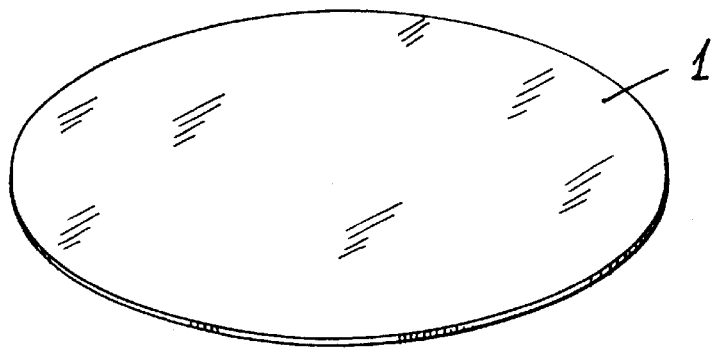
FIG. 1 is a perspective view illustrating an aluminium disc constituting a starting element for making the body of a coffee maker by a method according to the present invention.
Figure 2:
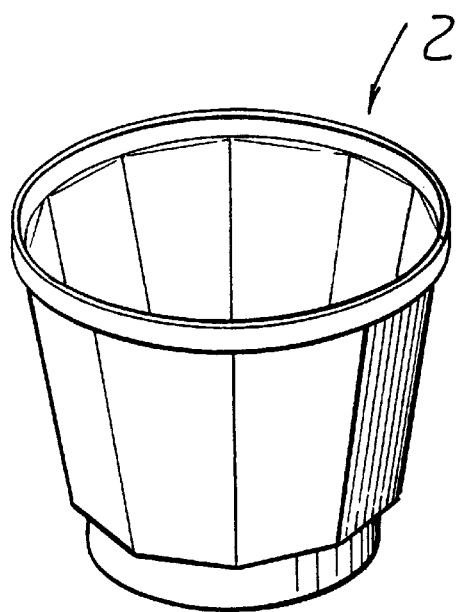
FIG. 2 is a reversed perspective view illustrating the body of a coffee maker boiler unit made by drawing the aluminium disc shown in FIG. 1.
Figure 3:
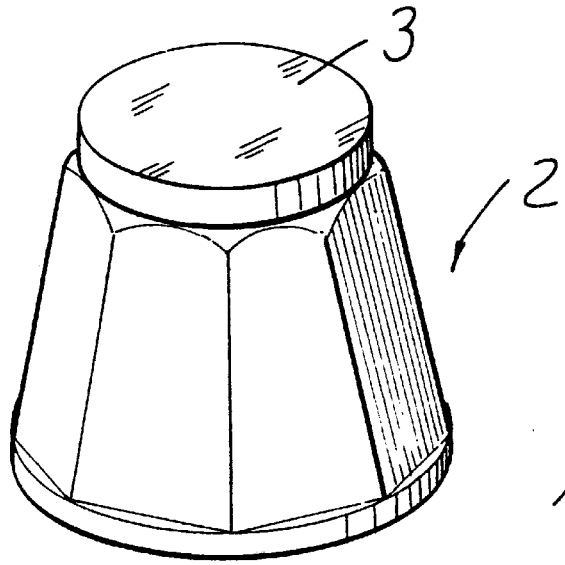
FIG. 3 is a further perspective view illustrating the body of FIG. 2, in an upright position thereof.
Figure 4:
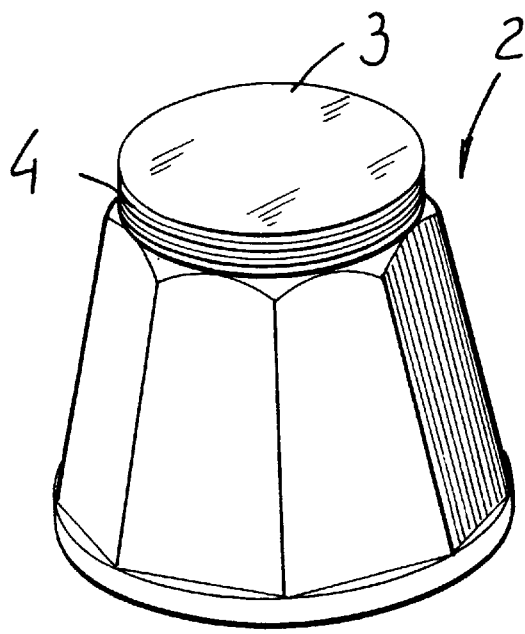
FIG. 4 is a further perspective view illustrating the boiler unit body, after a rolling step.

With reference to the figures of the accompanying drawings, the method according to the present invention comprises the step of drawing an aluminium disc 1, preferably a disc element made of an aluminium alloy UNI 1050, so as to provide a hollow body 2 which substantially reproduces the configuration of the boiler unit to be made, but having an open bottom portion thereof, as is clearly shown in FIG. 2, in which the body 2 of the boiler unit is shown in a reversed condition, and with the top end portion thereof being closed by a disc element 3, constituting the central region of said disc 1, being drawn, as clearly shown in FIG. 3.

Then, the body 2 of the boiler unit is subjected to a rolling operation about the region thereof arranged at its top end portion, so as to provide, about said top end portion, a thread 4 for engaging the boiler unit with the top portion of the coffee maker.

Figure 5:
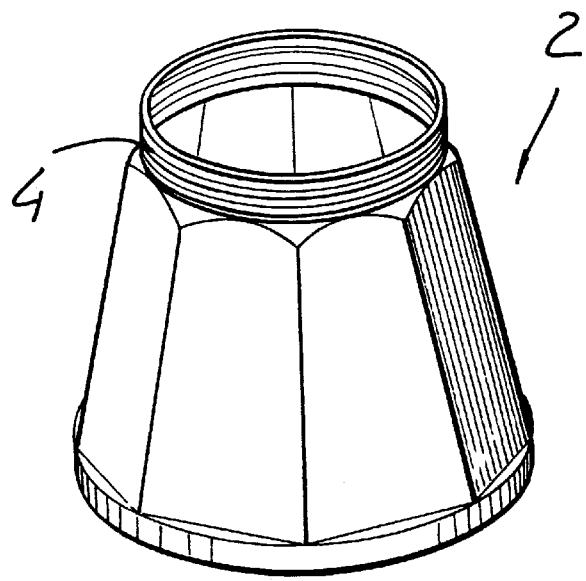
FIG. 5 is a further perspective view illustrating the boiler unit body after removal of the disc closing the top end portion thereof.
Figure 6:
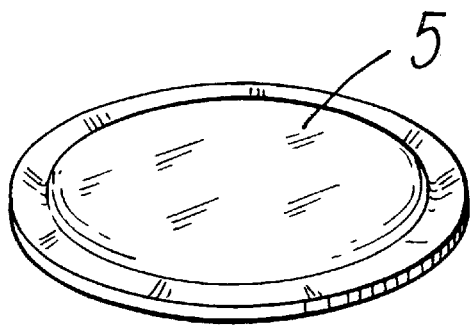
FIG. 6 is a further perspective view illustrating a bottom element to be used for closing the bottom end portion of the boiler unit body.
Figure 7:
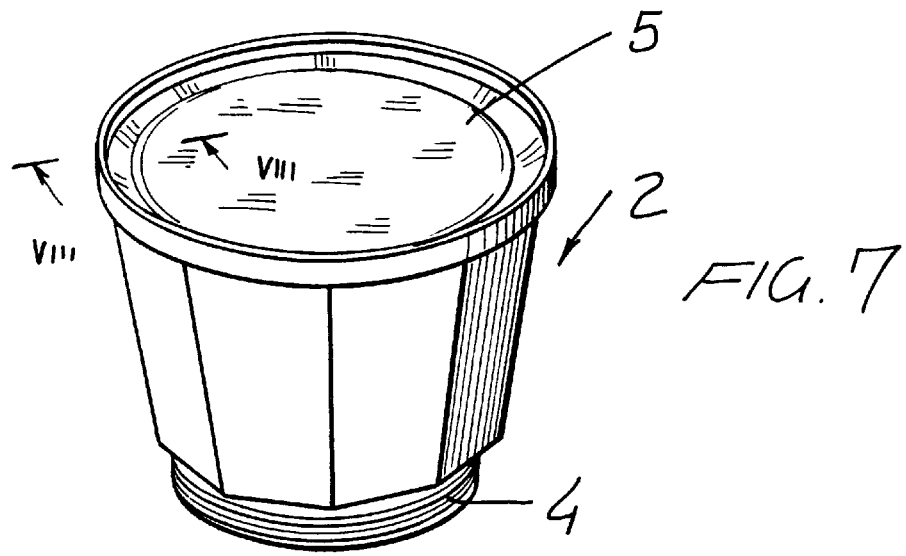
FIG. 7 is a further perspective view illustrating the boiler unit body in a reversed condition, the bottom element of FIG. 6 being arranged at the bottom end portion of the boiler unit body.
Figure 8:
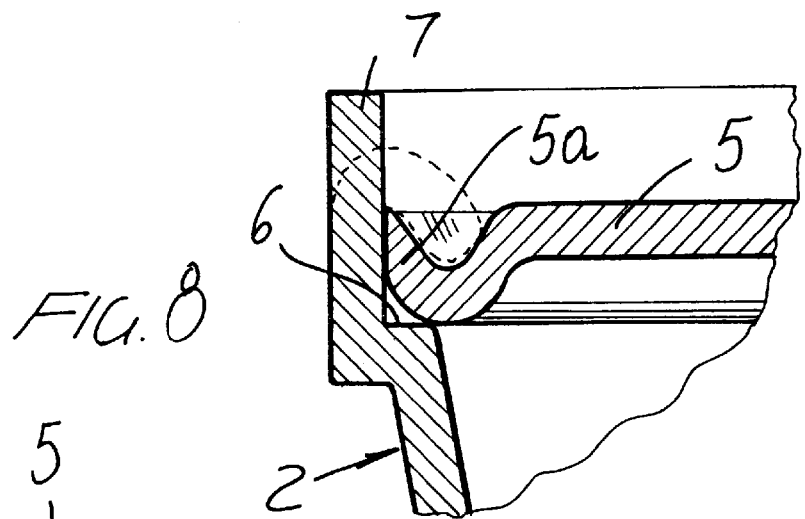
FIG. 8 illustrates an enlarged detail of FIG. 7, as cross-sectioned along the section line VIII—VIII.

As clearly shown in FIG. 5, after the rolling step, the disc element 3 is removed, by cutting, from the top end portion of the body 2, so as to provide the top opening of the boiler unit.

Finally, the bottom end portion of the body 2 is closed by applying a bottom element 5, which is affixed to said body 2 by means of a clamping operation.

More specifically, during the drawing step, on the inner surface of the body 2 is defined a ring-like shoulder 6, on which the bottom element 5 will rest.

The clamping of the bottom element 5 is performed by up-turning the edge 7 of the bottom end portion of the body 2 on the edge 5a of the bottom element 5, bearing on the ring-like shoulder 6, so as to simultaneously deform the edge 7 and edge 5 to cause said edges to fixedly engage by penetration thereby providing a high clamping strength.

The clamped connection, in particular, will provide a very safe coupling even if the pressure inside the boiler unit is very high.

Figure 9:
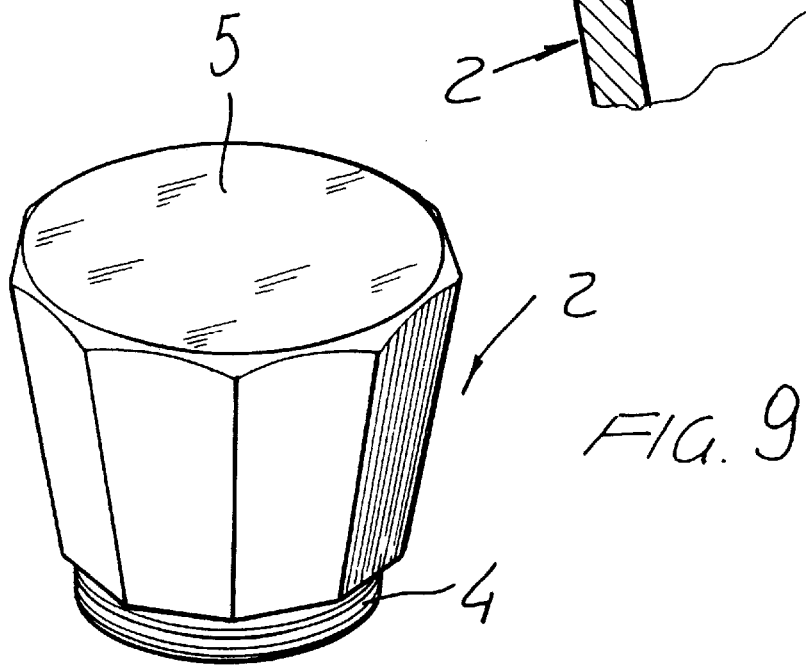
FIG. 9 is a further perspective view illustrating the boiler unit, in a reversed condition, at the end of the making method according to the present invention.

The boiler unit made by the above disclosed method, and as shown in FIG. 9, will be successively provided with a safety valve, in a per se known manner.

The bottom element 5, in particular, can be made by pressing an aluminium disc, preferably made of an aluminium alloy such as the mentioned UNI 1050 aluminium alloy.

From the above disclosure and from the figures of the accompanying drawings, it should be apparent that the disclosed method fully achieves the intended aim and objects.

In particular, the fact is to be pointed out that the disclosed method will allow to make coffee makers, in particular of the so-called moka type, starting from a substantially pure aluminium alloy, i.e. an aluminium material which has a very high oxidation resistance.

While the method according to the invention has been disclosed and illustrated with reference to a preferred embodiment thereof, it should be apparent that the disclosed embodiment is susceptible to several modifications and variations all of which will come within the spirit and scope of the appended claims.

I claim:

1. A method for making aluminum boiler units for coffee making machines of the type having a faceted upwardly tapering side surface characterized by the fact that it comprises the steps of a) drawing an aluminum disc to provide a hollow body having substantially a configuration of the boiler unit to be made, said hollow body including a closed top end portion and an open bottom end portion, b) rolling a thread about said top end portion, c) cutting away a metal disc closing the top end portion of said hollow body, and d) clamping an aluminum bottom element to said body for closing said bottom end portion thereof.

2. The method according to claim 1 wherein said body has an inner surface and in said drawing step a ring-like shoulder for bearing said bottom element thereon is formed on said inner surface of said body, near said open bottom end portion thereof.

3. The method according to claim 2 wherein said bottom end portion has an edge portion and said bottom element has an edge portion and said clamping step is performed by upturning said edge portion of said bottom end portion on said edge portion of said bottom element bearing on said ring-like shoulder, to cause said edge portion of said bottom element to penetrate into said edge portion of said bottom end portion.

* * * * *